(12) United States Patent
Wang

(10) Patent No.: US 9,156,734 B2
(45) Date of Patent: Oct. 13, 2015

(54) METHOD FOR MANUFACTURING FLUORESCENT POWDER SUBSTRATE AND LIQUID CRYSTAL MODULE USING FLUORESCENT POWDER SUBSTRATE

(75) Inventor: Yewen Wang, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 284 days.

(21) Appl. No.: 13/635,406

(22) PCT Filed: Jul. 12, 2012

(86) PCT No.: PCT/CN2012/078551
§ 371 (c)(1),
(2), (4) Date: Sep. 15, 2012

(87) PCT Pub. No.: WO2014/000326
PCT Pub. Date: Jan. 3, 2014

(65) Prior Publication Data
US 2014/0002770 A1   Jan. 2, 2014

(30) Foreign Application Priority Data
Jun. 28, 2012   (CN) .......................... 2012 1 0218794

(51) Int. Cl.
*B32B 37/14* (2006.01)
*C03C 27/00* (2006.01)
(Continued)

(52) U.S. Cl.
CPC ........... *C03C 27/00* (2013.01); *B32B 17/10009* (2013.01); *B32B 17/10146* (2013.01); *B32B 17/10807* (2013.01); *G02F 1/1336* (2013.01); *B32B 17/10944* (2013.01); *G02F 2001/133614* (2013.01)

(58) Field of Classification Search
CPC . C03C 27/00; G02F 1/1336; B32B 17/10807; B32B 17/10146; B32B 17/10944
USPC ................. 156/99, 104, 109; 445/23–26, 38; 65/36, 42, 57
See application file for complete search history.

(56) References Cited

U.S. PATENT DOCUMENTS 3,535,138 A * 10/1970 Wanmaker et al. ............. 427/64
7,244,480 B2 * 7/2007 Minaai et al. .................. 428/34
(Continued)

FOREIGN PATENT DOCUMENTS

CN   101315854 A   12/2008
CN   101847681 A    9/2010
(Continued)

*Primary Examiner* — Christopher Schatz
(74) *Attorney, Agent, or Firm* — Andrew C. Cheng

(57) ABSTRACT

A method for manufacturing fluorescent powder substrate includes (1) providing a fluorescent powder and glass panels of which one forms a through hole; (2) mixing the fluorescent powder in deionized water solvent to form a slurry; (3) applying the slurry to form a fluorescent powder layer on one glass panel; (4) laying flat a loop of low melting point glass powder on the glass panel on which the fluorescent powder layer is formed; (5) laminating the other glass panel on the glass panel; (6) burning the laminated glass panels at a temperature of 400-550° C. to completely combust organic substance therebetween and to have the low melting point glass powder bonding the glass panels together; (7) evacuating interior between the glass panels through the through hole; and (8) sealing the through hole to form a fluorescent powder substrate.

9 Claims, 2 Drawing Sheets

(51) Int. Cl.
*B32B 17/10* (2006.01)
*G02F 1/1335* (2006.01)

(56) References Cited

U.S. PATENT DOCUMENTS

| | | | |
|---|---|---|---|
| 2005/0035715 A1* | 2/2005 | Kado et al. | 313/582 |
| 2005/0168125 A1* | 8/2005 | Srivastava et al. | 313/486 |
| 2007/0087645 A1* | 4/2007 | Tsujii et al. | 445/24 |
| 2008/0297031 A1* | 12/2008 | Takahashi et al. | 313/503 |
| 2009/0096958 A1* | 4/2009 | Matsuura et al. | 349/70 |
| 2010/0208175 A1* | 8/2010 | Yasuda | 349/96 |
| 2010/0213816 A1* | 8/2010 | Saruta et al. | 313/483 |

FOREIGN PATENT DOCUMENTS

| | | |
|---|---|---|
| CN | 101899301 A | 12/2010 |
| CN | 102207265 A | 10/2011 |

* cited by examiner

METHOD FOR MANUFACTURING FLUORESCENT POWDER SUBSTRATE AND LIQUID CRYSTAL MODULE USING FLUORESCENT POWDER SUBSTRATE

BACKGROUND OF THE INVENTION

1. Field of the Invention

The present invention relates to the field of liquid crystal displaying, and in particular to a method for manufacturing a fluorescent powder substrate and a liquid crystal module using the fluorescent powder substrate.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that liquid crystal molecules are interposed between two parallel glass substrates and a plurality of vertical and horizontal fine electrical wires is arranged between the two glass substrates, whereby the liquid crystal molecules are controlled to change direction by application of electricity in order to refract light emitting from the backlight module to generate images. Since the liquid crystal panel itself does not emit light, light must be provided by the backlight module in order to normally display images. Thus, the backlight module is one of the key components of an LCD. The backlight module can be classified as two types, namely side-edge backlight module and direct backlight module, according to the position where light gets incident. The direct backlight module arranges a light source, such as a cold cathode fluorescent lamp (CCFL) or a light-emitting diode (LED) at the back side of the liquid crystal panel to form a planar light source that directly provides lighting to the liquid crystal panel. The side-edge backlight module arranges a backlight source of LED light bar at an edge of a backplane to be located rearward of one side of the liquid crystal panel. The LED light bar emits light that enters a light guide plate (LGP) through a light incident face of the light guide plate and is projected out through a light exit face after being reflected and diffused to thereby form, after transmitting through a set of optic films, a planar light source for the liquid crystal panel.

The LED light bar comprises a printed circuit board (PCB) and LED lamps mounted to and electrically connected to the PCB. An LED lamp is often composed of a blue LED chip coated with YAG fluorescent powder (B+Y Powders) or a blue LED chip coated with RB (Red and Green) powders (B+RG Powders) in order to emit white light. The fluorescent powder is often mixed with epoxy resin and silica and is then packaged on the LED chip with a dispenser. In such a structure, the LED chip and the epoxy resin and the silica are set in tight engagement with each other, whereby heat dissipation from the LED chip is inefficient. This sets the LED chip long in a high temperature condition. However, epoxy resin is poor in resisting high temperature and being long set in a high temperature condition will lead to turning yellowish and reducing light emission performance. Further, being kept long in a high temperature condition may easily cause color fading and eventually results in shortened lifespan of the LED lamp and increase of cost.

SUMMARY OF THE INVENTION

An object of the present invention is to provide a method for manufacturing a fluorescent powder substrate, which has a simple process and the fluorescent powder substrate so manufactured, when assembled with a liquid crystal module, is separate from a light-emitting chip so as to alleviate the influence of the fluorescent powder by the heat emitting from the light-emitting chip and thus extending the lifespan of use.

Another object of the present invention is to provide a liquid crystal module, which, through using a fluorescent powder substrate, provides uniform light illumination, extended lifespan of use, and reduced cost.

To achieve the objects, the present invention provides a method for manufacturing a fluorescent powder substrate, which comprises the following steps:

Step 1: providing a fluorescent powder and first and second glass panels, the second glass panel forming a through hole;

Step 2: mixing the fluorescent powder in deionized water solvent to form a slurry;

Step 3: applying the slurry to form a fluorescent powder layer on a surface of the first glass panel;

Step 4: laying flat a loop of low melting point glass powder along an edge of the surface of the first glass panel on which the fluorescent powder layer is formed;

Step 5: laminating the second glass panel on the first glass panel;

Step 6: burning the laminated first and second glass panels in air at a temperature of 400-550° C. so as to completely combust organic substance between the first and second glass panels and to have the low melting point glass powder bonding the first and second glass panels together;

Step 7: evacuating interior between the first and second glass panels to vacuum through the through hole formed in the second glass panel; and Step 8: sealing the through hole to form a fluorescent powder substrate.

The fluorescent powder is formed by mixing oxides, silicates, aluminates, nitrides, and oxynitrides.

The slurry comprises triethyl phosphate, zinc strontium calcium borate, calcium strontium pyrophosphate, and ammonium dihydrogen phosphate.

The deionized water solvent comprises a water-soluble polymer based bonding agent.

The water-soluble polymer based bonding agent comprises polyvinyl alcohol or ammonium polymethacrylate.

The through hole has a hole diameter of 0.2-1 cm.

The fluorescent powder layer is formed through printing or coating.

The first and second glass panels are high transmittance glass.

The present invention also provides a method for manufacturing fluorescent powder substrate, which comprises the following steps:

Step 1: providing a fluorescent powder and first and second glass panels, the second glass panel forming a through hole;

Step 2: mixing the fluorescent powder in deionized water solvent to form a slurry;

Step 3: applying the slurry to form a fluorescent powder layer on a surface of the first glass panel;

Step 4: laying flat a loop of low melting point glass powder along an edge of the surface of the first glass panel on which the fluorescent powder layer is formed;

Step 5: laminating the second glass panel on the first glass panel;

Step 6: burning the laminated first and second glass panels in air at a temperature of 400-550° C. so as to completely combust organic substance between the first and second glass panels and to have the low melting point glass powder bonding the first and second glass panels together;

Step 7: evacuating interior between the first and second glass panels to vacuum through the through hole formed in the second glass panel; and Step 8: sealing the through hole to form a fluorescent powder substrate;

wherein the fluorescent powder is formed by mixing oxides, silicates, aluminates, nitrides, and oxynitrides;

wherein the slurry comprises triethyl phosphate, zinc strontium calcium borate, calcium strontium pyrophosphate, and ammonium dihydrogen phosphate;

wherein the deionized water solvent comprises a water-soluble polymer based bonding agent;

wherein the water-soluble polymer based bonding agent comprises polyvinyl alcohol;

wherein the through hole has a hole diameter of 0.2-1 cm;

wherein the fluorescent powder layer is formed through printing or coating; and wherein the first and second glass panels are high transmittance glass.

The present invention also provides a liquid crystal module, which comprises: a fluorescent powder substrate and a liquid crystal display panel and a backlight source that are respectively set at opposite sides of the fluorescent powder substrate. The fluorescent powder substrate comprises first and second glass panels and a fluorescent powder layer interposed between the first and second glass panels. The backlight source emits light that is converted by the fluorescent powder substrate to form a planar light source for the liquid crystal display panel.

The liquid crystal display panel comprises an array substrate, a color filter substrate laminated on the array substrate, liquid crystal interposed between the array substrate and the color filter substrate, and a sealing resin frame interposed between the array substrate and the color filter substrate and set along edges of the color filter substrate. The sealing resin frame seals the liquid crystal between the array substrate and the color filter substrate so as to form a liquid crystal box. The planar light source has a size corresponding to the liquid crystal box.

The efficacy of the present invention is that the present invention provides a method for manufacturing a fluorescent powder substrate, which uses a simple manufacturing process to seal fluorescent powder between two glass panels so that in assembling a liquid crystal module, the fluorescent powder is separate from a light-emitting chip to thereby alleviate the influence of the heat emitting from the light-emitting chip on the fluorescent powder, extend the lifespan of use of the fluorescent powder, and further reduce the manufacture cost of the liquid crystal module. Further, the fluorescent powder substrate provides uniform lighting and may be used to replace or eliminate the use of a light guide plate or a diffuser plate to further reduce the cost.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
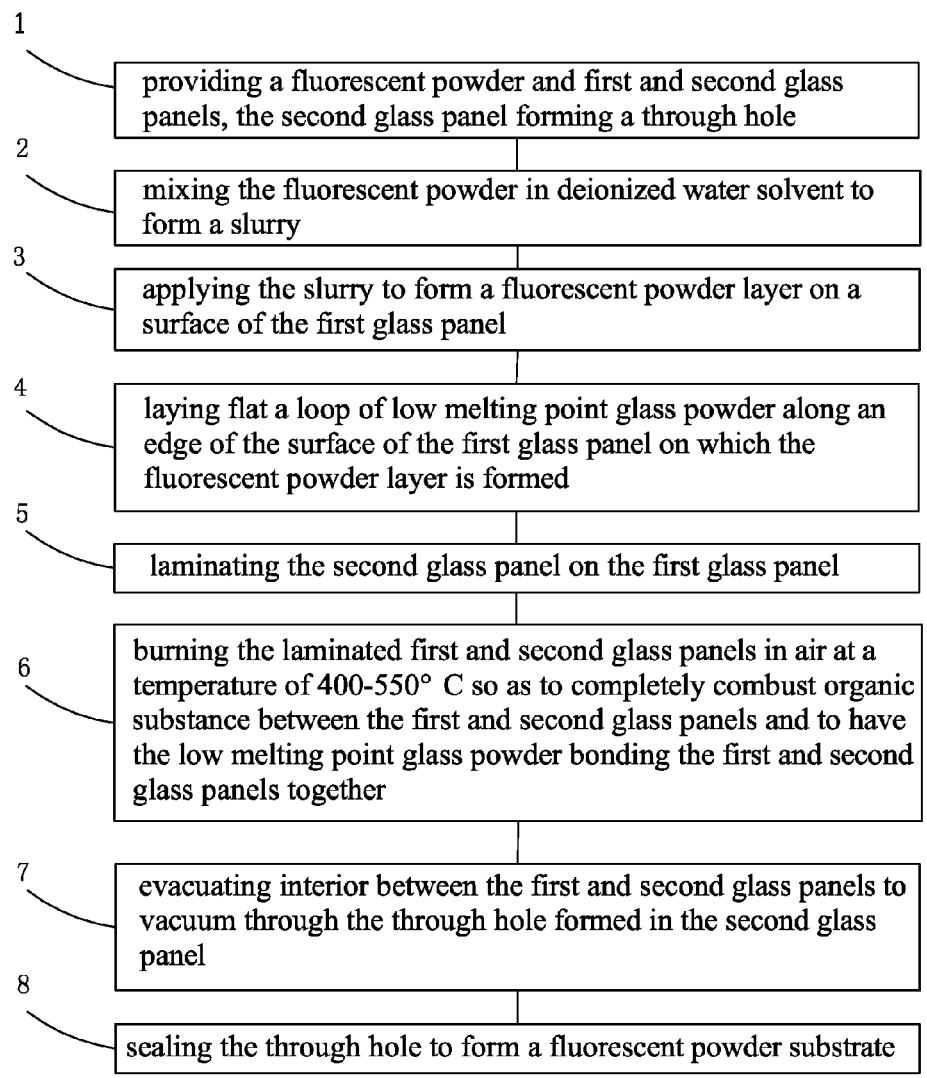
FIG. 1 is a flow chart illustrating a method for manufacturing fluorescent powder substrate according to the present invention.

Referring to FIG. 1, the present invention provides a method for manufacturing a fluorescent powder substrate, which comprises the following steps:

Step 1: providing a fluorescent powder and first and second glass panels, the second glass panel forming a through hole.

The fluorescent powder is formed by mixing oxides, silicates, aluminates, nitrides, and oxynitrides. The specific composition can be determined according to the color of the light emitting from a light-emitting chip used and the color of light obtained when the color of the light transmits through the fluorescent powder. The first and second glass panels are both high transmittance glass and the second glass panel forms a through hole, which has a hole diameter of 0.2-1 cm.

Step 2: mixing the fluorescent powder in deionized water solvent to form a slurry.

The deionized water solvent comprises a water-soluble polymer based bonding agent. In the instant embodiment, the water-soluble polymer based bonding agent comprises polyvinyl alcohol or ammonium polymethacrylate, which has no strong smell, does not contaminate the surroundings, does not affect the health of operators, is of low cost, and is helpful for cost control.

The slurry further comprises triethyl phosphate, zinc strontium calcium borate, calcium strontium pyrophosphate, and ammonium dihydrogen phosphate for increasing bonding power and improving quality of fluorescent powder.

Step 3: applying the slurry to form a fluorescent powder layer on a surface of the first glass panel.

The fluorescent powder layer can be formed through printing or coating.

Step 4: laying flat a loop of low melting point glass powder along an edge of the surface of the first glass panel on which the fluorescent powder layer is formed.

Step 5: laminating the second glass panel on the first glass panel.

The second glass panel is set so that a surface thereof is positioned on the glass powder so as to enclose the fluorescent powder between the first and second glass panels.

Step 6: burning the laminated first and second glass panels in air at a temperature of 400-550° C. so as to completely combust organic substance between the first and second glass panels and to have the low melting point glass powder bonding the first and second glass panels together.

Step 7: evacuating interior between the first and second glass panels to vacuum through the through hole formed in the second glass panel.

The vacuum helps preventing deterioration of the fluorescent powder so as to further extend the lifespan of the fluorescent powder.

Step 8: sealing the through hole to form a fluorescent powder substrate.

The fluorescent powder substrate so manufactured according to the present invention can be used in combination with chips from blue light to red light or event an ultraviolet chip to provide different color temperature and different spectra and can be assembled with a color filter to provide various color gamuts with uniform illumination.

It is noted that the fluorescent powder substrate can be made in different sizes or a complete piece to partially or completely replace a light guide plate or a diffuser plate thereby eliminating the use of light guide plate or diffuser plate and thus further reducing the manufacture cost.

Figure 2:
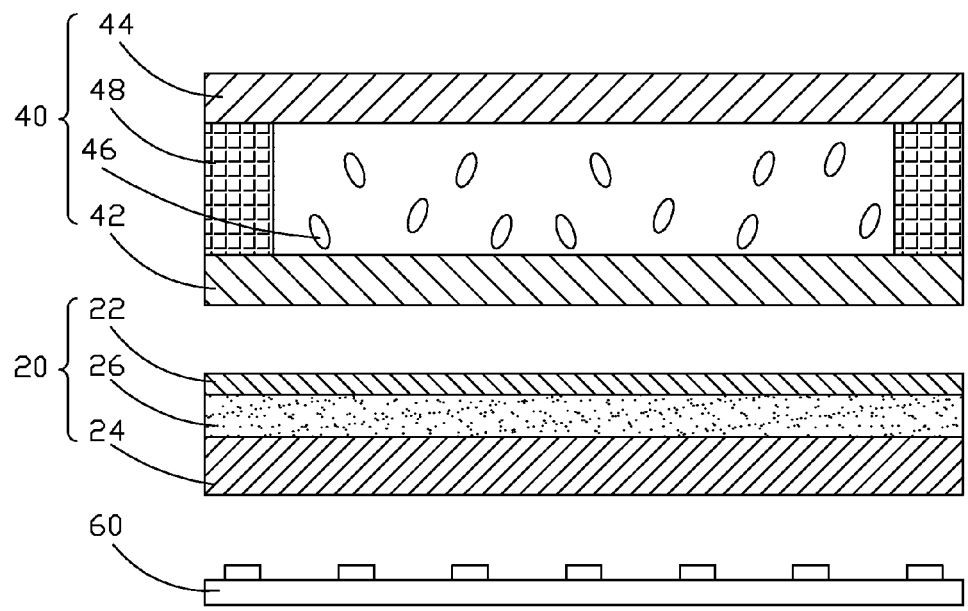
FIG. 2 is a schematic view showing a liquid crystal module according to the present invention.

Referring to FIG. 2, the present invention also provides a liquid crystal module, which comprises a fluorescent powder substrate 20 and a liquid crystal display panel 40 and a backlight source 60 that are respectively set at opposite sides of the fluorescent powder substrate 20.

The fluorescent powder substrate 20 comprises first and second glass panels 22, 24 and a fluorescent powder layer 26 interposed between the first and second glass panels 22, 24. The backlight source 60 emits light that is converted by the fluorescent powder substrate 20 to form a planar light source of uniform illumination for the liquid crystal display panel 40.

The liquid crystal display panel 40 comprises an array substrate 42, a color filter substrate 44 laminated on the array substrate 42, liquid crystal 46 interposed between the array substrate 42 and the color filter substrate 44, and a sealing resin frame 48 interposed between the array substrate 42 and the color filter substrate 44 and set along edges of the color filter substrate 44. The sealing resin frame 48 seals the liquid crystal 46 between the array substrate 42 and the color filter substrate 44 so as to form a liquid crystal box. The planar light source has a size corresponding to that of the liquid crystal box.

The liquid crystal module according to the present invention further comprises additional components, including a backplane (not shown) and a mold frame (not shown), which can be the components that are conventionally used so that additional description will be omitted herein.

In summary, the present invention provides a method for manufacturing a fluorescent powder substrate, which uses a simple manufacturing process to seal fluorescent powder between two glass panels so that in assembling a liquid crystal module, the fluorescent powder is separate from a light-emitting chip to thereby alleviate the influence of the heat emitting from the light-emitting chip on the fluorescent powder, extend the lifespan of use of the fluorescent powder, and further reduce the manufacture cost of the liquid crystal module. Further, the fluorescent powder substrate provides uniform lighting and may be used to replace or eliminate the use of a light guide plate or a diffuser plate to further reduce the cost.

Based on the description given above, those having ordinary skills of the art may easily contemplate various changes and modifications of the technical solution and technical ideas of the present invention and all these changes and modifications are considered within the protection scope of right for the present invention.

What is claimed is:
1. A method for manufacturing fluorescent powder substrate, comprising the following steps:
    (1) providing a fluorescent powder and first and second glass panels each comprising a single layer of glass having a glass surface, the second glass panel having a through hole;
    (2) mixing the fluorescent powder in deionized water solvent to form a slurry;
    (3) applying the slurry to form a fluorescent powder layer directly on the glass surface of the first glass panel;
    (4) laying flat a loop of low melting point glass powder along an edge of the glass surface of the first glass panel on which the fluorescent powder layer is directly formed;
    (5) laminating the second glass panel on the first glass panel with the glass surface of the second glass panel facing the first glass panel;
    (6) burning the laminated first and second glass panels in air at a temperature of 400-550° C. so as to completely combust organic substance between the first and second glass panels and to have the low melting point glass powder bonding the first and second glass panels together;
    (7) evacuating interior between the first and second glass panels to vacuum through the through hole formed in the second glass panel; and
    (8) sealing the through hole to form a fluorescent powder substrate, which comprises the fluorescent powder layer interposed between and in direct contact with the glass surfaces of the first and second glass panels.

2. The method for manufacturing fluorescent powder substrate as claimed in claim 1, wherein the fluorescent powder is formed by mixing oxides, silicates, aluminates, nitrides, and oxynitrides.

3. The method for manufacturing fluorescent powder substrate as claimed in claim 1, wherein the slurry comprises triethyl phosphate, zinc strontium calcium borate, calcium pyrophosphate, and ammonium dihydrogen phosphate.

4. The method for manufacturing fluorescent powder substrate as claimed in claim 1, wherein the deionized water solvent comprises a water-soluble polymer based bonding agent.

5. The method for manufacturing fluorescent powder substrate as claimed in claim 4, wherein the water-soluble polymer based bonding agent comprises polyvinyl alcohol or ammonium polymethacrylate.

6. The method for manufacturing fluorescent powder substrate as claimed in claim 1, wherein the through hole has a hole diameter of 0.2-1 cm.

7. The method for manufacturing fluorescent powder substrate as claimed in claim 1, wherein the fluorescent powder layer is formed through printing or coating.

8. The method for manufacturing fluorescent powder substrate as claimed in claim 1, wherein the first and second glass panels are high transmittance glass.

9. A method for manufacturing fluorescent powder substrate, comprising the following steps:
    (1) providing a fluorescent powder and first and second glass panels each comprising single layer of glass having a glass surface, the second glass panel having a through hole;
    (2) mixing the fluorescent powder in deionized water solvent to form a slurry;
    (3) applying the slurry to form a fluorescent powder layer on the glass surface of the first glass panel;
    (4) laying flat a loop of low melting point glass powder along an edge of the glass surface of the first glass panel on which the fluorescent powder layer is formed;
    (5) laminating the second glass panel on the first glass panel with the glass surface of the second glass panel facing the first glass panel;
    (6) burning the laminated first and second glass panels in air at a temperature of 400-550° C. so as to completely combust organic substance between the first and second glass panels and to have the low melting point glass powder bonding the first and second glass panels together;

(7) evacuating interior between the first and second glass panels to vacuum through the through hole formed in the second glass panel; and (8) sealing the through hole to form a fluorescent powder substrate, which comprises the fluorescent powder layer interposed between and in direct contact with the glass surfaces of the first and second glass panels;

wherein the fluorescent powder is formed by mixing oxides, silicates, aluminates, nitrides, and oxynitrides;

wherein the slurry comprises triethyl phosphate, zinc strontium calcium borate, calcium pyrophosphate, and ammonium dihydrogen phosphate;

wherein the deionized water solvent comprises a water-soluble polymer based bonding agent;

wherein the water-soluble polymer based bonding agent comprises polyvinyl alcohol;

wherein the through hole has a hole diameter of 0.2-1 cm;

wherein the fluorescent powder layer is formed through printing or coating; and wherein the first and second glass panels are high transmittance glass.

\* \* \* \* \*